United States Patent [19]

Suzumura et al.

[11] Patent Number: 4,805,569
[45] Date of Patent: Feb. 21, 1989

[54] INTAKE SYSTEM FOR AN ENGINE

[75] Inventors: Koji Suzumura; Hunihiko Fujiwara; Naoya Matsuo; Kouichi Miyamoto, all of Hiroshima, Japan

[73] Assignee: Mazda Motor Corporation, Hiroshima, Japan

[21] Appl. No.: 155,156

[22] Filed: Feb. 11, 1988

[30] Foreign Application Priority Data

Feb. 13, 1987 [JP] Japan ............................ 62-18876[U]

[51] Int. Cl.⁴ ............................................ F02B 31/00
[52] U.S. Cl. ................................ 123/308; 123/188 M
[58] Field of Search ................ 123/306, 308, 188 M, 123/432

[56] References Cited

U.S. PATENT DOCUMENTS 3,154,059 10/1964 Witzky ........................... 123/188 M
4,366,787 1/1983 Gale .................................... 123/306

FOREIGN PATENT DOCUMENTS 2922058 10/1970 Fed. Rep. of Germany ... 123/188 M

Primary Examiner—E. Rollins Cross
Attorney, Agent, or Firm—Wegner & Bretschneider

[57] ABSTRACT

An intake system for an engine is disclosed in which an inlet passageway for one cylinder includes a common inlet passageway and first and second branch inlet passages having a branch portion at a downstream side of the common inlet passageway, said first branch inlet passage communicating with a first inlet port and said second branch inlet passage communicating with a second inlet port; said first inlet port having an opening for the cylinder and being designed to allow air to be admitted into the cylinder in a direction in which the air swirls therein, and said second inlet port having an opening therefor and being designed to cause air to be admitted thereinto in a direction it disturbs formation of such swirls; and said inlet passageway being provided at its inner wall portion with a wall member for deflecting air admitted from the common inlet passageway toward the first branch inlet passage.

17 Claims, 7 Drawing Sheets

INTAKE SYSTEM FOR AN ENGINE

FIELD OF THE INVENTION

The present invention relates to an intake system for an internal combustion engine and, more particularly, to an intake apparatus adapted to allow air admitted to swirl in a cylinder.

BACKGROUND OF THE INVENTION

Recently, many engines have plural and in particular two inlet ports for one cylinder.

It is known that, in order to ensure stability in combustibility particularly at the time of low loads, it is effective to cause air admitted to swirl in the cylinder, and many attempts have been made to improve inlet passages for formation of swirls. For instance, in an engine having two inlet ports for one cylinder, an independent inlet passage communicating with one of the inlet ports is provided with an opening/closing valve, while the other inlet port is disposed in a direction substantially tangential with the cylinder to allow air admitted to swirl therein. For such an engine, the opening/closing valve is closed at the time of low load to cause air to be admitted through the other inlet port only whereby strong swirls are formed. This leads to the fact that swirls caused to occur by air admitted from one inlet port are not prevented by blocking admission of air from the other inlet port which disturbs occurrence of swirls. At the time of high loads, of course, the valve is opened to supply a sufficient amount of air through the two inlet ports whereby adequate outputs are ensured.

For such engines as causing swirls using the opening/closing valve, an actuator for driving the opening or closing the valve and other devices should further be mounted leading to complexity in structural arrangements and raising costs of manufacturing.

DISCUSSION OF PRIOR ART

Japanese Patent Publication (laid-open) No. 156,408/1981 discloses an intake system of simplified construction capable of causing swirls. This system is designed that one cylinder is provided with openings for two inlet ports with an opening area for one of the inlet ports is larger than that for the other. Furthermore, one inlet port is disposed and arranged in a direction with respect to the cylinder so as to allow air supplied therefrom to swirl in the cylinder in a clockwise direction, for example, while the other inlet port is disposed and arranged in a direction with respect thereto so as to cause air supplied therefrom to swirl therein in a counterclockwise direction. Although the two inlet ports are arranged in such a manner as forming swirls rotating in the cylinder in opposite directions, their respective effective opening areas differ from each other so that magnitudes of the swirls formed therein are caused to vary with the difference of the effective opening areas. This results in the fact that swirls are finally caused to occur in a direction governed by one of the inlet ports having the larger effective opening area—in this case, swirls being formed in the clockwise direction—at the time of low loads.

Furthermore, two inlet ports with different sizes of openings may not provide a sufficiently wide area for an effective opening area as a whole and may decrease outputs to a great extent. Particularly at high loads, an inlet resistance is rendered too high for the inlet port having an opening with a smaller size, thereby a sufficient amount of air becomes unlikely to be admitted and, as a consequence, no adequate magnitude of outputs are produced. It is further to be noted that a flow velocity of air admitted from the inlet port having the larger effective opening area tend to be slowed down and this phenomenon is not preferred from the point of view forming strong swirls in the cylinder because a magnitude of swirls is considered as a kinetic energy so that both a flow rate and a flow velocity are related thereto. This sets limits to forming of strong swirls particularly at low loads at which a flow rate is small in nature because a flow velocity is rendered smaller, too.

SUMMARY OF THE INVENTION

Accordingly, the present invention has the object to provide an intake system for an engine adapted to be of extremely simplified construction and capable of forming strong swirls in the cylinder efficiently while preventing a decrease in output.

This object is attained by the invention in that the intake system for an engine is formed with an inlet passageway for one cylinder including a common inlet passageway and first and second branch inlet passages having a branch portion at a downstream side of the common inlet passageway, said first branch inlet passage communicating with a first inlet port and said second branch inlet passage communicating with a second inlet port; said first inlet port having an opening for the cylinder and being designed to allow air to be admitted into the cylinder in a direction in which the air swirls therein, and said second inlet port having an opening therefor and being designed to cause air to be admitted thereinto in a direction it disturbs formation of such swirls; and said inlet passageway being provided at its inner wall portion with a wall member for deflecting air admitted from the common inlet passageway toward the first branch inlet passage.

With this arrangement, even if effective opening areas of the first and second inlet ports are identical to each other, a magnitude of swirls caused by admission of air from the first inlet port can be rendered stronger than that caused by admission thereof from the second inlet port particularly at low loads. This permits a formation of swirls in a direction along a flow of the air admitted from the first inlet port. It is further to be noted that, although the provision of a wall member for deflecting an air flow increases a resistance of the air resulting in a decrease in a flow coefficient, such an increase can be reduced to a smaller level than an increase brought about by a provision of the second inlet port with a smaller effective opening area. As a result, a decrease of a large amount of outputs can be prevented.

Further advantages and characteristics of the invention will become apparent from the ensuing detailed description of some preferred exemplary embodiments, taken in conjunction with the drawings.

DETAILED DESCRIPTION OF THE PREFERRED EMBODIMENTS

Figure 1:
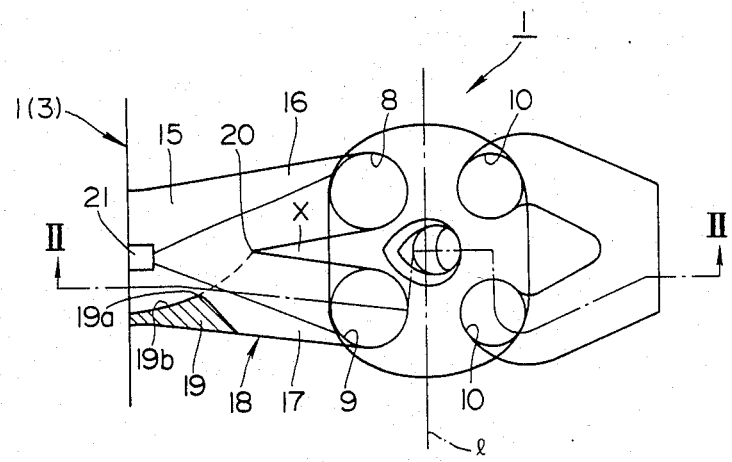
FIG. 1 is a plane view illustrating briefly a first embodiment of an intake system according to the present invention when looking at the inlet passageway from the side of a combustion chamber.
Figure 2:
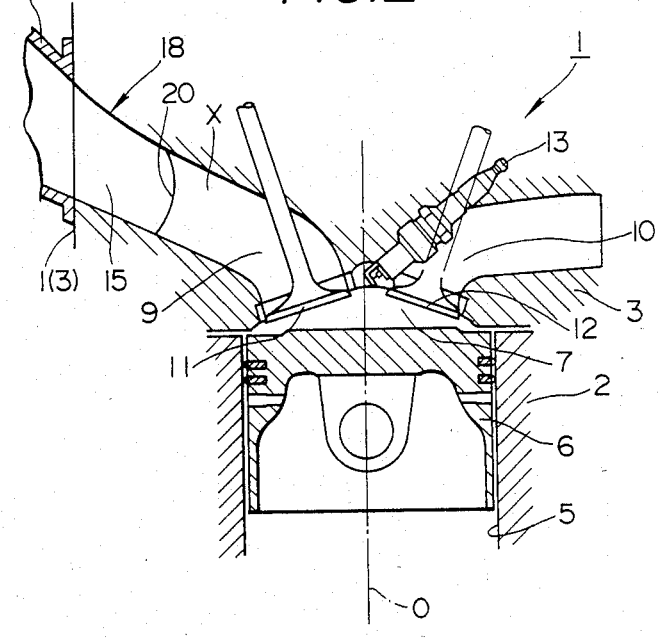
FIG. 2 is a cross sectional view taken on line II—II of FIG. 1.
Figure 3:
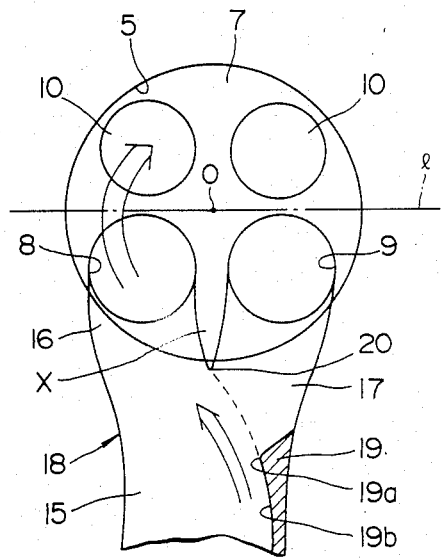
FIG. 3 is a plane view illustrating FIG. 1 on a larger scale.

Referring to FIGS. 1 to 3 which illustrate a first embodiment of the intake system for an internal combustion engine according to the present invention, an engine 1 is formed with a cylinder block 2, a cylinder head 3, a cylinder head cover (not shown) and so on. In each cylinder 5 formed in the engine 1 is reciprocally mounted a piston 6 on top of which a combustion chamber 7 is disposed. The combustion chamber 7 is divided by the cylinder block 2, the cylinder head 3 disposed integrally with the cylinder block 2 so as to close one end of the cylinder 5, and the piston 6. The combustion chamber 7 has openings for first and second inlet ports 8 and 9, respectively, as well as exhaust ports 10. The opening of the first inlet port 8 is substantially the same in size as that of the second inlet port 9. The second inlet port 9 is provided with an inlet valve 11, as shown in FIG. 2, with an inlet valve (not shown therein) mounted likewise in the first inlet port 8. The exhaust ports 10 are provided each with an exhaust valve 12. The valves 11 and 12 are operatively driven by a valve driving mechanism (not shown) and opened or closed at predetermined timings. A spark plug 13 is mounted in the combustion chamber 7.

As shown in FIG. 3, the first and second inlet ports 8 and 9 are disposed in one half area of the combustion chamber 7 defined by a plane extending along imaginary line l passing in the direction perpendicular to the cylinder axis O and extending in the cylinder alignment direction, viz., in the direction in which the engine output shafts are aligned. The inlet ports 8 and 9 are symmetrically and separately situated adjacent each other in the direction along the imaginary line l, while the exhaust ports 10 are likewise situated at the opposite other half side of the combustion chamber 7 adjacent each other in a manner symmetrical with the inlet ports and extending along the imaginary line l. In this embodiment, one camshaft (not shown) is provided for driving the inlet and exhaust valves in the direction passing through the cylinder axis O and extending parallel to the imaginary line l. The spark plug 13 is arranged such that its firing portion is situated on the cylinder axis O in the center of the combustion chamber 7 and further that it is mounted in an inclined manner with respect to the cylinder axis O in order to avoid interference with the camshaft.

To the cylinder head 3 is connected an inlet tube 14 for each cylinder. The inlet tube 14 is provided with a surge tank, an air cleaner, an air flowmeter, a throttle and so on, all of which are not shown therein, and an open air is admitted into the inlet tube 14 through these elements. This inlet tube 14 and a predetermined range of the inside of the cylinder head 3 serve as a common inlet passageway 15. A downstream portion of the common inlet passageway 15 passing through the cylinder head 3 is divided by a partition X into a first branch inlet passage 16 and a second branch inlet passage 17. The first branch inlet passage 16 is communicated with the first inlet port 8 and the second branch inlet passage 17 is with the second inlet port 9. Air portions are admitted from the first and second inlet ports 8 and 9 to swirl in the cylinder 5 in directions opposite to each other. More specifically, the air portion supplied from the first inlet port 8 is caused to flow and swirl in the cylinder 5 in the clockwise direction as shown by the arrow in FIG. 3, while the other air portion admitted from the second inlet port 9 is caused to flow and swirl therein in the counterclockwise direction.

Figure 6:
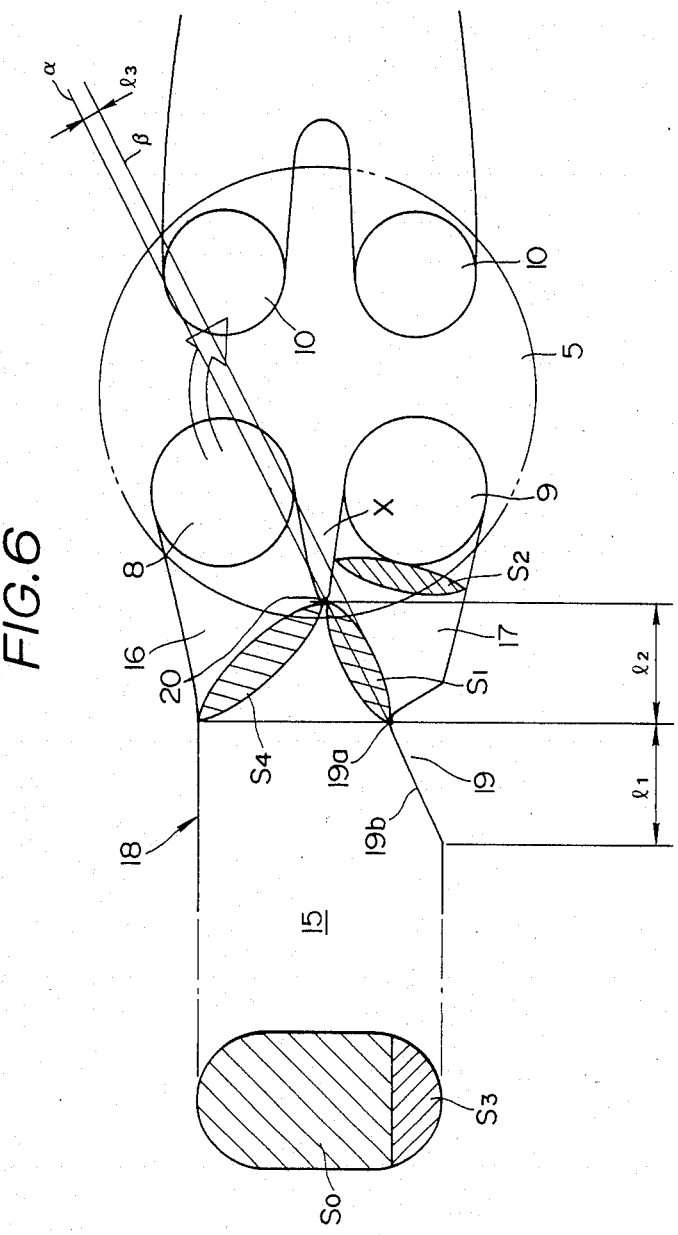
FIG. 6 is a plane view illustrating briefly an intake apparatus for test use with dimensions of portions to which the intake system according to the present invention is applied.

The common inlet passageway 15 and the first and second inlet passages 16 and 17 constitute an inlet passageway 18 that is provided with a wall member formed with a deflecting wall portion 19 molded integrally with the cylinder head 3 and formed therein. The wall portion 19 is located on the side wall of the common inlet passageway 15 at the position opposite to the first inlet port 8 in the direction along the imaginary line l and constitutes substantially an inner side wall portion of the inlet passageway 18 in a particular range interconnecting the common inlet passageway 15 with the second branch inlet passage 16. The wall portion 19 is formed at the position proximate the upstream of the partition X in such a manner that its upstream side wall surface portion 19b is curved inwardly closer to the axis of the common inlet passageway 15 as it comes closer to its protruded top end portion 19a, viz., to the combustion chamber 7 from the common inlet passageway 15 and that its top end portion 19a protrudes toward a branched top portion 20 upstream of the partition X, as shown by the broken lines in FIGS. 1 and 3. An effective opening area $S_1$ (as shown in FIG. 6) for the second inlet passage 17 is designed to become narrower at the position between the protruded top end portion 19a of the deflecting wall portion 19 and the branched top portion 20 of the partition X than an effective opening area $S_4$ (as shown in FIG. 6) for the first inlet passage 16 at the position between the branched top portion 20 thereof and the side wall portion of the inlet passageway 18 opposite to the top end portion 19a thereof in the direction along the imaginary line l. The effective opening area $S_1$ is set to become substantially identical to an effective opening area $S_2$ of the second inlet passage 16 (FIG. 6) The air admitted from the common inlet passageway 15 is thus caused to flow in a larger quantity into the first branch inlet passage 16 than into the second branch inlet passage 17 by means of the arrangement in which the effective opening area for one of the branch inlet passages is set larger than that for the other and in which admission of the air is deflected.

The common inlet passageway 15 upstream of the deflecting wall portion 19 is provided with a fuel injection valve 21 that supplies fuel into the first and second branch passages 16, 17 through the common inlet passageway in such a manner that the fuel injected therefrom does not hit directly against the wall surface of the wall portion 19.

With this arrangement, the intake apparatus according to the present invention allows the air admitted to be drawn into the combustion chamber 7 as the piston 6 moves downwardly. At this time, an inlet resistance in the second branch inlet passage 17 is caused to increase by the provision of the deflecting wall portion 19 whereby its side wall portion 19b upstream thereof permits an appreciable deflection of the admitted air into the first branch inlet passage 16. This leads to the fact that an amount of the air admitted into the first branch inlet passage 16 becomes remarkably larger than that admitted into the second branch inlet passage 17 and, as a consequence, admission of the air from the first inlet port 8 into the combustion chamber 7 causes strong swirls therein leading to an improvement in combustibility. In this case, it is to be noted that a flow coefficient for the first branch inlet passage 16 can be decreased to a remarkably lower extent compared with the second inlet port 9 with a smaller opening area in order to cause swirls with similar magnitudes of strength. This enables a remarkable improvement in combustibility while suppressing a decrease in an amount of air admission particularly at the time of high loads to minimized levels, that is, controlling a reduction in output to the possible lowest levels. This accordingly does not require provision of the inlet ports 8 and 9 in different sizes for causing swirls in the combustion chamber 7 leaving a larger freedom in design from the point of view of ensurement of outputs.

Figure 4:
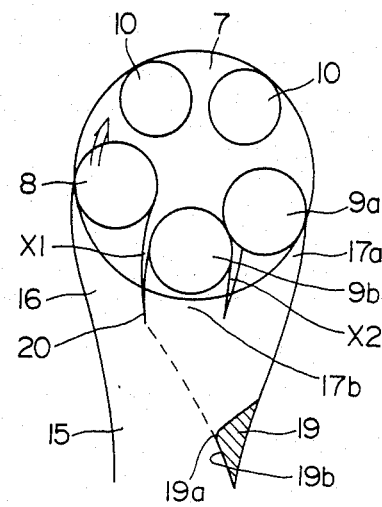
FIG. 4 is a plane view illustrating briefly a second embodiment thereof.
Figure 5:
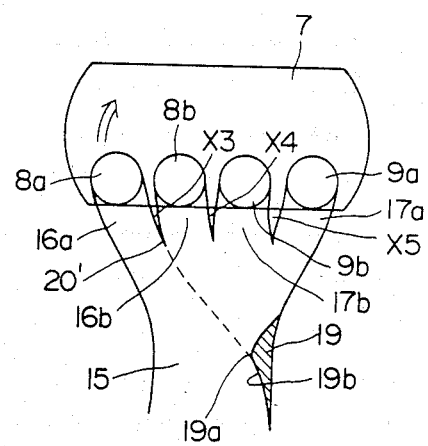
FIG. 5 is a plane view illustrating briefly a third embodiment thereof.

FIG. 4 illustrates a second embodiment of the intake apparatus and FIG. 5 illustrates a third embodiment thereof in accordance with the present invention. The same reference numerals and symbols are used for the same elements, while the reference numerals for those elements having the same function but different structure are provided with an alphabetical letter or an apostrophe. A new description of these similar element will accordingly be omitted.

Referring now to FIG. 4, the intake apparatus is of the type having three inlet ports, one first inlet port 8 and two second inlet ports 9a and 9b with the one second inlet port 9b arranged between the first inlet port 8 and the other second inlet port 9a. These inlet ports 8, 9a and 9b are disposed in the circumferential direction of the combustion chamber 7. The first inlet port 8 is communicated with a branch inlet passage 16, and the one second inlet port 9a is communicated with a second branch inlet passage 17a and the other second inlet port 9b is with a third branch inlet passage 17b. The first branch inlet passage 16 is separated by a partition X1 from the third branch inlet passage 17b which in turn is separated by a partition X2 from the second branch inlet passage 17a.

An upstream side wall surface portion 19b of a deflecting wall portion 19 is curved in substantially the same manner as in the first embodiment so as to allow its surface extension in a plane to extend toward and incide with a top portion 20, viz., an upstream tip portion of a partition X1 along the imaginary line shown by the broken lines in FIG. 4. This structural arrangement for the wall portion 19 as set out in the second embodiment also permits a deflection of air admitted from a common inlet passageway 15 into the first branch inlet passage 16 whereby an amount of the air admitted into the first inlet port 8 becomes larger than a combined amount of the air portions admitted into the two second inlet ports 9a and 9b. This serves as causing strong swirls in substantially the same manner as set out above for the first embodiment.

Referring then to FIG. 5, the third embodiment is shown of the type having four inlet ports, in which exhaust ports are not shown but an appropriate number of exhaust ports, for example the same number as that of the inlet ports, may be disposed. The two out of the four inlet ports serve as first inlet ports 8a and 8b and the other two serve as second inlet ports 9a and 9b. These inlet ports are arranged at one side of a combustion chamber 7 in series in the order of the first inlet ports 8a and 8b and the second inlet ports 9b and 9a respectively from the left end to the right end in FIG. 5. The first inlet ports 8a and 8b are communicated respectively with a first and second branch inlet passages 16a and 16b, and the second inlet ports 9a and 9b are communicated respectively with a third and fourth branch inlet passages 17a and 17b. The first branch inlet passage 16a is separately disposed by a first partition X3 from the second inlet passage 16b which in turn is separately arranged by a second partition X4 from the fourth inlet passage 17b. This branch inlet passage 17b is further separated by a third partition X5 from the third branch inlet passage 17a. A common inlet passageway is provided with a deflecting wall portion 19 that is disposed in substantially the same manner as in the above embodiments so as to have an upstream side wall surface portion curved in cross section extending along the imaginary line (as shown by the broken lines in FIG. 5) toward and passing through a tip portion 20', viz., an edge portion upstream of the first partition X3. This structure enables an appreciable deflection of air mainly into the first branch inlet passage 16a, thus causing the admitted air portion to swirl at a radius larger than in the second embodiment and forming stronger swirls. At this time, the air portion admitted from the other first branch inlet passage 16b into the other first inlet port 8b is allowed to flow in the direction of forming swirls so that the air portion introduced from the first inlet port 8b serves as enlarging and promoting swirls in the combustion chamber 7 in cooperation with the air portion admitted from the other inlet port 8b.

There will be hereinbelow described experimental examples in which the intake apparatus according to the present invention has been applied to a four-cylinder engine of an in-line construction with displacement of 1,839 cc. with reference to comparison examples as will be described below in detail.

A first experimental example uses an engine of the SOHC (single overhead camshaft) type with natural aspiration. A spark plug 13 in this case is mounted at a declined position with respect to the cylinder axis O, as shown in FIG. 2. A second experimental example uses an engine with DOHC (double overhead camshaft) of the turbocharging type. A spark plug 13 in this case is mounted extending in the same direction as the cylinder axis O.

The intake apparatus according to the present invention applied to the two experimental examples have each sizes for the elements as shown in FIG. 6 as follows:

$S_o$ is an effective opening area of the common inlet passageway 15 in oval cross section. A diameter of the passageway 15 is 37 mm, when translated into a circular cross section, so that $S_o$ becomes 1075 mm².

$S_1$ is an effective opening area defined between the protruded edge portion 19a of the deflecting wall portion 19 and the branch tip 20. $S_1$ is set substantially identical to $S_2$ as will be described below.

$S_2$ is an effective opening area of the second branch inlet passage 17, viz., an effective opening area for the inlet ports 8 and 9, in circle cross section. A diameter of the second branch inlet passage 17 is 30 mm so that $S_2$ becomes 707 mm².

$S_3$ is an area in a projected plane when looking at the deflecting wall 19 from the upstream side of the common inlet passageway 15. The area of $S_3$ is 16% of the $S_o$.

$l_1$ is a length of the upstream side wall surface 19b. $l_1$ is 24 mm.

$l_2$ is a distance between the projected top end 19a of the wall portion 19 and the top portion 20. $l_2$ is 21 mm.

$l_3$ is an offset amount of the directional line of $\beta$ of the upstream side wall surface 19b at the position of the tip portion 20 with respect to the straight line $\alpha$ connecting the protruded top end 19a and the tip portion 20. $l_3$ is +3 mm (in this case, a direction approaching toward the inlet port 9 from the tip portion 20 is considered as an offset of the direction represented by the symbol "+").

A distance between the protruded top end 19a and an inlet valve of the inlet port 9 is 20 mm when measured along the axis of the second branch inlet passage 17.

Figure 7:
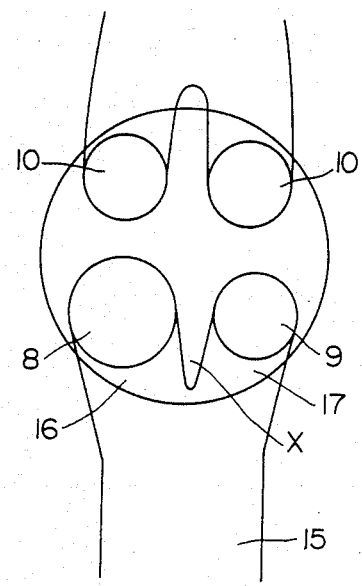
FIGS. 7 and 8 are plane views illustrating briefly constructions of intake systems for comparison uses.

FIG. 7 illustrates a brief structural arrangement for an intake apparatus used for a first comparison example corresponding to the above-mentioned Japanese Patent Publication (laid-open) No. 156,408/1981. The intake apparatus disclosed therein varies merely from the intake apparatus used for the first experimental example described above in that no deflecting wall portion is mounted and an effective opening area of a branch inlet passage 16 for an inlet port 8 is different from that of a branch inlet passage 17 for an inlet port 9. That is, the effective opening area for the inlet port 8 is 683 mm² (29.5 mm in diameter), while that for the inlet port 9 is 455 mm² (24.0 mm in diameter).

Figure 8:
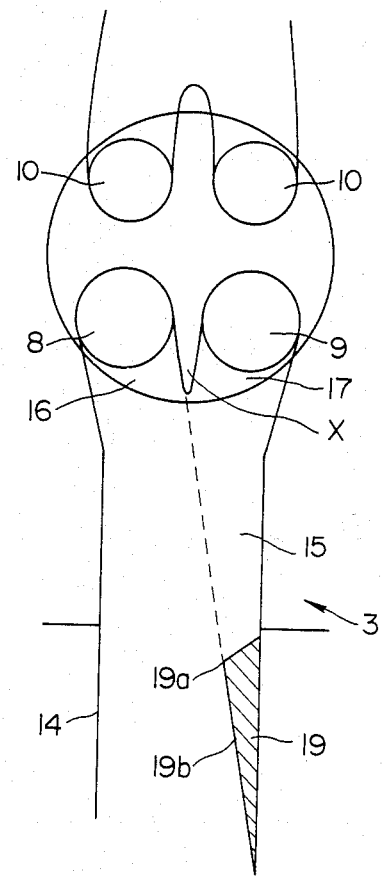

FIG. 8 illustrates an inlet passage structure of an intake apparatus used for a second comparison example for a brief description on the difference between the second comparison and experimental examples. The second comparison example differs from the second experimental example simply in the fact that a deflecting wall portion 19 is disposed on an inlet tube 14 proximate a cylinder head 3.

Figure 9:
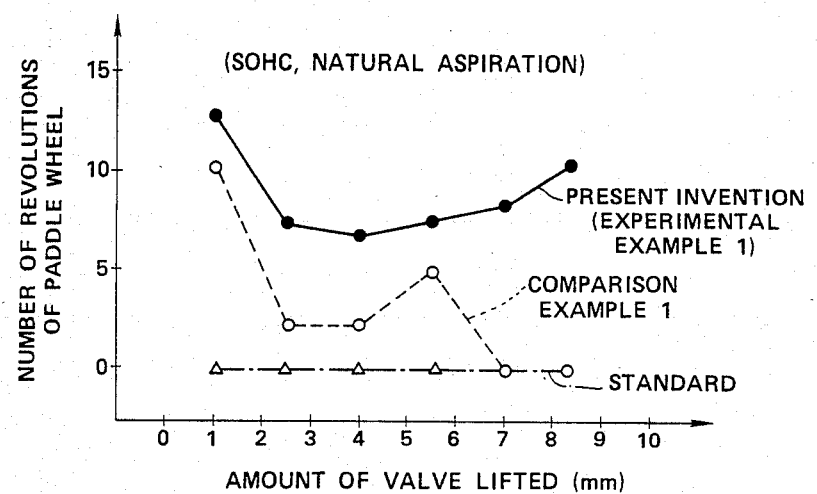
FIGS. 9 and 10 are graphs showing comparison data between Experimental Example 1 of the present invention and Comparison Example 1 of FIG. 7.

A comparison of magnitudes of swirls between the first experimental and comparison examples is shown in FIG. 9 indicating a graph in which the axis of abscissa represents an amount of the inlet valve lifted (an amount of the valve opened) in mm. and the axis of ordinate represents a number of revolutions of a paddle wheel. It is noted here that the paddle wheel is disposed in the cylinder 5 and designed to rotate with larger revolutions as magnitudes of swirls become larger as is known to the art. As is apparent from FIG. 9, it is understood that the experimental example 1 produces higher magnitudes of swirls than the comparison example 1 does. It is further noted that the term "STANDARD" used in FIG. 9 means a usual engine of the type having two inlet ports as a whole and having the deflecting wall portion 19 removed from the type of FIG. 6. The same thing can be said of those indicated in FIGS. 10 and 11.

Figure 10:
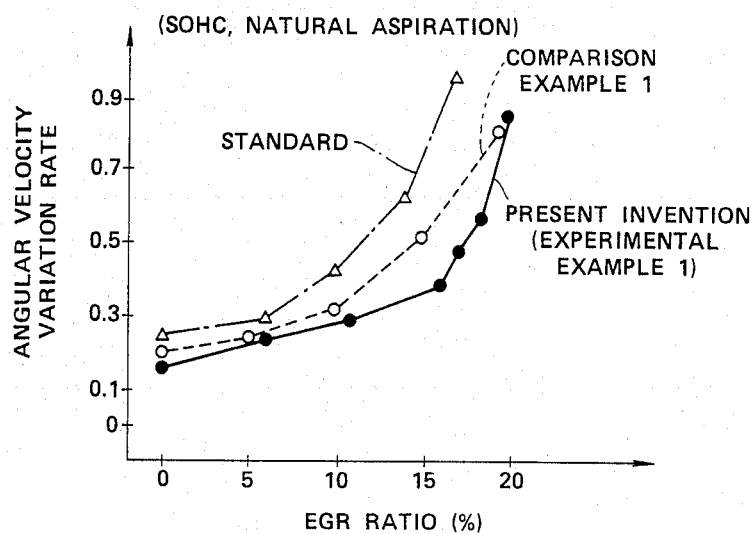

FIG. 10 shows the relationship of EGR ratios in percentage with angular velocity variation rates between the first experimental and comparison examples when the engines have been actually operated under constant operational conditions at 1,500 r.p.m. and an average effective pressure of 3 kg/cm². with an ignition timing at MBT.

It is to be noted here that the angular velocity variation rate is considered to be an allowable level when it is 0.3 rad/second on less and that the EGR ratio at the angular velocity variation ratio of 0.3 rad/second is an EGR limit. Given the foregoing, FIG. 10 indicates that the first experimental example becomes higher by approximately 3% in the EGR ratio that the first comparison example when the EGR ratios have been raised to the point of the EGR limit. This means that the engine used for the first experimental example can reduce losses in pumping to such an extent as corresponding to the enlarged portion of the EGR rate, leading to saving fuel.

It is further noted that the engine used for the first experiment has decreased by approximately 2% in maximum output compared with the "STANDARD" engine. It is understood, however, that this degree of a decrease in maximum output causes no problem at all from the practical point of view.

Figure 11:
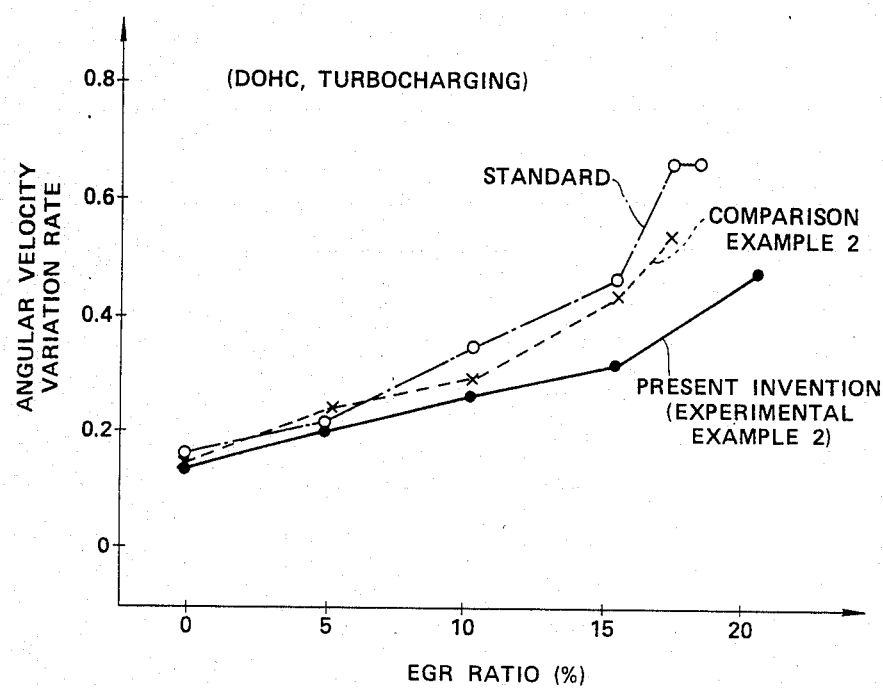
FIG. 11 is a graph showing comparison data between Experimental Example 2 of the present invention and Comparison Example 2 of FIG. 8.

FIG. 11 shows likewise the relationship of the EGR ratios in percentages vs. the angular velocity variation rates between the second experimental and comparison examples. Operational conditions of the engines used therefor were 1,500 r.p.m. and an average effective pressure of 3 kg/cm² at a constant operation with a air-to-fuel ratio of 16. An ignition timing was a point extremely close to the MBT point in a range in which no knocking is caused to occur. As is apparent from FIG. 11, it is understood that an engine with DOHC of the turbocharging can elevate the EGR ratios. It is to be noted that the second experimental example has demonstrated an increase in maximum output by approximately 4% compared with the "STANDARD" engine. It has been conventionally understood that an engine of the supercharging type presents the difficulty in igniting at the time of MBT during an operation condition at which particularly maximum outputs are produced due to problems with occurrence of knockings so that the ignition timing should be delayed to a great extent from the MBT. However, it is to be noted that the second experiment indicates that swirls can be occurred at operational conditions of producing maximum outputs and that limits on knocking are improved, thereby enabling the ignition timing to approach to the MBT to that extent and increasing maximum outputs. It is further noted that strong swirls caused by the arrangement according to the present invention offer an improved velocity of combustion so that a combustion at higher velocities reduces temperatures of exhaust gases by approximately 40° C., thus assuring reliability of a turbocharger. Furthermore, an air-to-fuel ratio can be set at best values in the lean range, thus improving fuel economy and outputs.

From the results, the following considerations may be made on preferable size settings for the elements.

1. From the viewpoint of ensuring sufficient admission of air particularly at the time of high load, it is preferred that $S_1$ does not become too small. As it is preferred that the effective opening area of the second branch inlet passage 17 for the inlet port 9 is not substantially restricted, $S_1$ is set to be preferably equal to or larger than $S_2$.

2. It is preferred from the same viewpoint as above that $S_3$ is not rendered too large. That $S_3$ becomes too large leads to a restriction to the effective opening area of the common inlet passageway 15. On the contrary, it is not preferred that $S_3$ becomes too small because this may weaken the effect of the deflecting wall portion 19 on a deflection of the air toward the inlet port 8. Thus $S_3$ is set to be preferably in the range from $0.1S_o$ to $0.2S_o$ ($0.1S_o \leq S_3 \leq 0.2S_o$).

3. Further, it is not preferred that $l_3$ becomes too large to the "+" direction, that is, the upstream side wall surface 19b of the wall portion 19 is positioned closer to a great extent to the inlet port 9 side than the tip portion 20 because there becomes the strong tendency that a smooth flow-in of air deflected by the wall portion 19 may be blocked by the presence of the partition X. On the contrary, if $l_3$ would become too large in the "−" direction, a smooth flow of air deflected by the wall portion 19 toward the inlet port 8 may be blocked. It is furthermore noted that, if $l_3$ would be set constant, the deflecting effect produced by the wall portion 19 becomes stronger as $l_1$ becomes longer. Accordingly, the absolute value of $l_3$ is set to be preferably equal to or less than $0.2\, l_1$.

4. It is not preferred that $l_1$ becomes higher, if a height of the protruded top end portion 19a or $S_3$ would be set constant, because the directional line $l_3$ for the upstream side wall surface 19b is offset relatively to the "+" direction for the reasons as have been described immediately in the item 3 above. It is to be noted that there is a limit on the height of the protruded top end 19a because it makes an effective opening area of the common inlet passageway 15 smaller. Thus $l_1$ is set to be preferably in the range between 10 mm and 30 mm. It is to be noted that $l_1$ may become larger as an effective opening area of the common inlet passageway 15 becomes larger; however, commercially available engines have usually displacements of 400 to 600 cc per cylinder so that the above-mentioned range may be rendered sufficient.

5. It is noted that the relationship of $l_2$ with $l_1$ has something to do with the settings of $l_2$ and $l_1$ themselves as well as with the settings of $l_3$; thus $l_2$ is set to be preferably in the range from $0.7l_1$ to $1.3l_1$ ($0.7l_1 \leq l_2 \leq l_1$).

It is to be noted here that the above items 1 to 3 can be applied to the embodiments as shown in FIGS. 4 and 5.

It is to be understood that the deflecting wall portion 19 may be disposed on the branched portions 20 or 20′ and that opening sizes for the inlet ports 8 and 9 may be different from each other if a sufficient admission of air can be ensured in such embodiments. In the latter case, an effective opening area for the first inlet port 8 is rendered larger.

It is further to be understood that the foregoing text and drawings relate to embodiments of the invention given by way of example but not limitation. Various other embodiments and variants are possible within the spirit and scope of the invention.

What is claimed is:

1. An intake system for an engine comprising an inlet passageway for one cylinder including a common inlet passageway and first and second branch inlet passages having a branch portion at a downstream side of the common inlet passageway, said first branch inlet passage communicating with a first inlet port and said second branch inlet passagae communicating with a second inlet port;

said first inlet port having an opening for the cylinder and being designed to allow air to be admitted into the cylinder in a direction in which the air swirls therein, and said second inlet port having an opening therefor and being designed to cause air to be admitted thereinto in a direction it disturbs formation of such swirls; and said inlet passageway being provided at its inner wall portion with a wall member for deflecting air admitted from the common inlet passageway toward the first branch inlet passage.

2. An intake system as claimed in claim 1, wherein an upstream side wall surface of said wall member upstream of its protruded top end is directed toward a branched portion between said first and second branch inlet passages.

3. An intake system as claimed in claim 2, wherein $l_3$ is equal to or less than $0.2l_1$, in which $l_1$ stands for a length of said upstream side wall surface and $l_3$ stands for an offset amount of an extension line from said upstream side wall surface at the position of said branched portion with respect to the straight line connecting a top end of said wall member to said branched portion.

4. An intake system as claimed in claim 2, wherein $S_1$ is equal to or larger than $S_2$, in which $S_1$ stands for an effective opening area defined between the top end of said wall member and said branched portion and $S_2$ stands for an effective opening area of said second branch inlet passage.

5. An intake system as claimed in claim 2, wherein $S_3$ is in a range from $0.1S_o$ to $0.2S_o$ ($0.1S_o \leq S_3 \leq 0.2S_o$), in which $S_o$ is an effective opening area of said common inlet passageway and $S_3$ is an area of projection of said wall member when looked at from an upstream side of said common inlet passageway.

6. An intake system as claimed in claim 2, wherein there is provided with one first inlet port and one second inlet portion.

7. An intake system as claimed in claim 6, wherein $l_1$ is substantially the same lengths as $l_2$, in which $l_1$ is a length of said upstream side wall surface of said wall member; and $l_2$ is a length between the top end of said wall member and said branched portion.

8. An intake system as claimed in claim 7, wherein $l_2$ is in a range from $0.7l_1$ to $1.3l_1$ ($0.7l_1 \leq l_2 \leq 1.3l_1$).

9. An intake system as claimed in claim 8, wherein $l_1$ is in a range from 10 mm to 30 mm.

10. An intake system for an engine comprising an inlet passageway for one cylinder including a common inlet passageway and first and second branch inlet passages having a branch portion at a downstream side of the common inlet passageway, said first branch inlet passage communicating with a first inlet port and said second branch inlet passagae communicating with a second inlet port;

said first inlet port having an opening for the cylinder and being designed to allow air to be admitted into the cylinder in a direction in which the air swirls therein, and said second inlet port having an opening therefor and being designed to cause air to be admitted thereinto in a direction it disturbs formation of such swirls;

said inlet passageway being provided at its inner wall portion with a wall member for deflecting air admitted from the common inlet passageway toward the first branch inlet passage;

said wall member including a protruded top end protruding toward a branched portion between said first and second branch inlet passages and an upstream side wall surface upstream of the top end having a surface in a plane extending toward and passing through the branched portion; and dimensions for portions being set to satisfy the following relationships:

$l_3$ is equal to or less than $0.2l_1$;

$S_1$ is equal to or larger than $S_2$; and $l_1$ is substantially the same in length as $l_2$; in which $l_1$ is a length of said upstream side wall surface;

$l_2$ is a length of a portion defined between a protruded top end of said wall member and said branched portion;

$l_3$ is an offset amount of an extension line from said upstream side wall surface at the position of said branched portion with respect to the straight line connecting the top end of said wall member to said branched portion;

$S_1$ is an effective opening area defined between said top end and said branched portion; and $S_2$ is an effective opening area of said second branch inlet passage.

11. An intake system as claimed in claim 10, wherein $l_2$ is in a range from $0.7l_1$ to $1.3l_1$; $l_1$ is in a range from 10 mm to 30 mm; and $S_3$ is in a range from $0.1S_o$ to $0.2S_o$, in which $S_3$ is an area of projection of said wall member when looked at from an upstream side of said common inlet passageway.

12. An intake system as claimed in claim 2, wherein a total number of said first and second inlet ports is three or more.

13. An intake system as claimed in claim 12, wherein an upstream side wall surface of said wall member is directed toward only one of said inlet ports.

14. An intake system as claimed in claim 1, wherein said wall member is disposed in a predetermined area ranging from said common inlet passageway to said second branch inlet passage.

15. An intake system as claimed in claim 1, wherein said wall member is disposed on a side wall portion of said common inlet passageway at a position in an alignment direction of said first and second inlet ports opposite to the position at which said first inlet port is disposed.

16. An intake system for an engine comprising a cylinder block in which at least one cylinder is disposed;

a cylinder head integrally formed with said cylinder block so as to close one end of said cylinder;

a piston mounted reciprocally and slidably in said cylinder and defining a combustion chamber in association with said cylinder block and cylinder head;

said cylinder head being provided with first and second inlet ports, said first inlet port being designed to allow air to be admitted into the cylinder in a direction in which the air swirls therein, and said second inlet port being designed to cause air to be admitted thereinto in a direction it disturbs formation of such swirls;

said cylinder head being provided with a common inlet passageway and first and second branch inlet passages divided into each other by a partition formed in said cylinder head, said first branch inlet passage communicating a downstream side of said common inlet passageway with said first inlet port, and said second branch inlet passage communicating the downstream side of said common inlet passageway with said second inlet port; and said cylinder head being further provided with a wall member for deflecting air admittedd from said common inlet passageway toward said first branch inlet passage.

17. An intake system as claimed in claim 16, wherein said wall member is disposed in a predetermined range defined between said common inlet passageway and said second branch inlet passage so as to protrude its one end portion toward an upstream side of said partition.

* * * * *